(No Model.)
R. A. PARKE.
AUTOMATIC FLUID PRESSURE BRAKE APPARATUS.
No. 550,083. Patented Nov. 19, 1895.
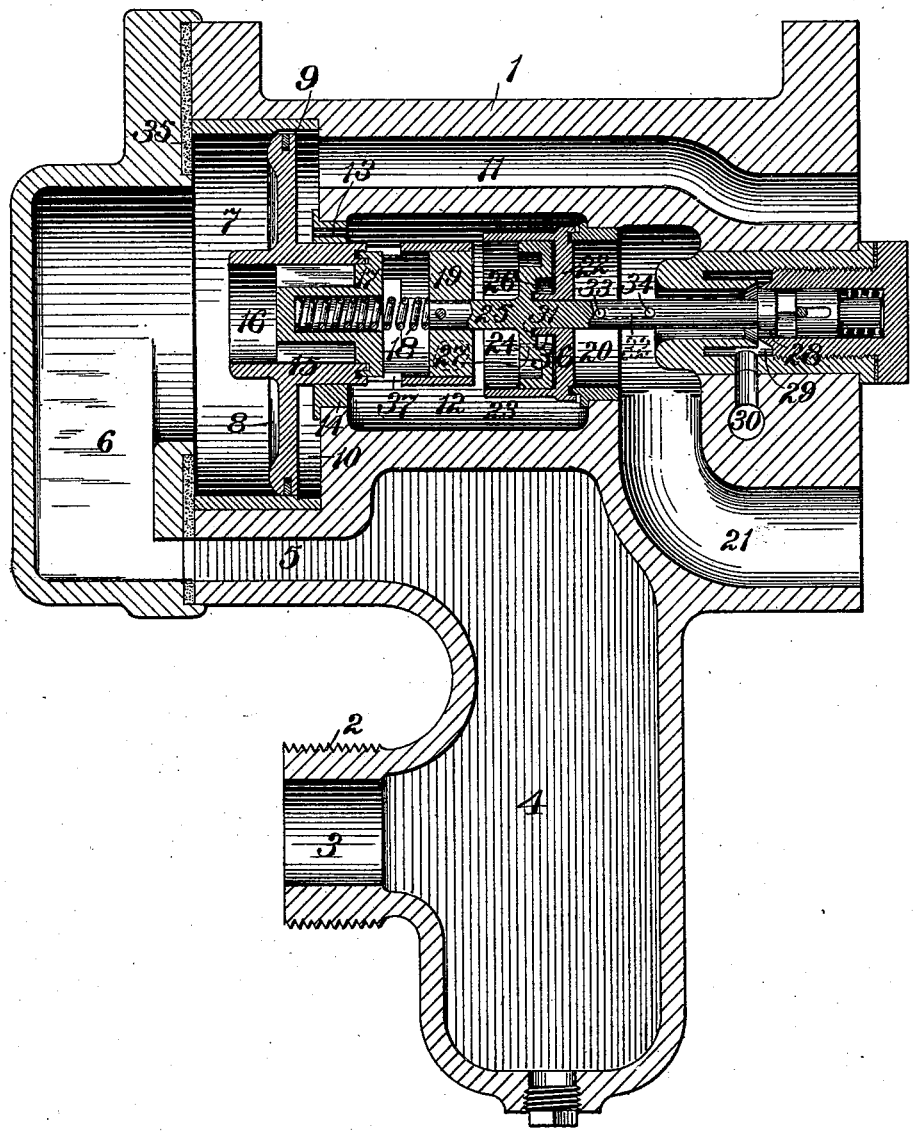
WITNESSES:
T. J. Hogan.
Chas. F. Miller.
INVENTOR
R. A. Parke
by J. Snowden Bell.
Att'y.

UNITED STATES PATENT OFFICE.

ROBERT A. PARKE, OF NEW BRIGHTON, NEW YORK, ASSIGNOR TO THE WESTINGHOUSE AIR BRAKE COMPANY, OF PITTSBURG, PENNSYLVANIA.

AUTOMATIC FLUID-PRESSURE BRAKE APPARATUS.

SPECIFICATION forming part of Letters Patent No. 550,083, dated November 19, 1895.

Application filed July 3, 1895. Serial No. 554,796. (No model.)

*To all whom it may concern:*

Be it known that I, ROBERT A. PARKE, a citizen of the United States, residing at New Brighton, in the county of Richmond and State of New York, have invented or discovered a certain new and useful Improvement in Automatic Fluid-Pressure Brake Apparatus, of which improvement the following is a specification.

The object of my invention is to provide an improvement in automatic fluid-pressure brake apparatus; and to this end my invention consists in a new and improved quick-action device for locally venting the train-pipe in emergency applications of the brakes, which is operative by a rapid movement only of the triple-valve piston and which is inoperative when the triple-valve piston is moved slowly by a gradual reduction of train-pipe pressure in making service applications of the brakes.

The accompanying drawing is a vertical longitudinal central section through a triple-valve device, showing an application of my improvement.

The main casing 1 of the triple-valve device is connected by means of the screw-threaded nozzle 2 with the train-pipe or with a branch therefrom, and fluid under pressure from the train-pipe flows through the passages 3, 4, 5, and 6 into the piston-chamber 7, where it acts on the piston 8 and moves it into the position shown in the drawing. The piston 8 is then in position to uncover the feed-groove 9, through which the fluid under pressure flows around the edge of the piston 8 into the space 10 and through the passage 11 into the auxiliary reservoir. The space 10 on the right of the piston 8 communicates with the valve-chamber 12 through the small passage 13 in the bushing 14, and when the brakes are released and the parts are in the positions shown in the drawing the chamber 12 is charged with fluid under substantially the same pressure as that in the auxiliary reservoir and train-pipe.

A tubular extension 15 on the piston 8 is fitted to slide easily in the bushing 14 without being loose enough to permit any appreciable quantity of fluid to pass around it from the space 10 to the valve-chamber 12, and a passage 16, through the piston 8 and through the tubular extension 15, is provided with a check or non-return valve 17, which, in service applications and when the brakes are released, closes the passage 16. A spring 18, which bears at one end against the inner end wall 19 of the tubular extension and at the other end against the valve 17, tends to hold the valve 17 to its seat.

A comparatively large passage 20, between the valve-chamber 12 and the brake-cylinder passage 21, is controlled by a valve 22, which is unseated only in making emergency applications of the brakes. A piston 24, which is connected to or secured to the stem 25, is fitted to slide in a cylindrical extension 23 on the back of the valve 22. The piston 24 is so fitted in the cylinder 23 as to permit the pressures of the fluid on its opposite sides to equalize when it is stationary or to permit a partial equalization before it is withdrawn from the cylinder 23, when it is moved slowly, as in making service applications of the brakes. The passage around the piston 24, through which such equalization is effected, is, however, so limited that when the triple-valve piston 8 and the piston 24 are moved rapidly, as in making emergency applications of the brakes, there will be little or no flow of fluid around the piston 24, and the reduction of pressure in the space 26 on the right of the piston will be sufficient to permit the atmospheric pressure in the passage 20 to unseat the valve 22.

The passage from one side of the piston 24 to the other side, which permits the equalization of pressures on its opposite sides, may be formed by making the piston 24 fit in the cylinder 23, so as to permit leakage around the piston, or a groove may be formed in the edge of the piston or in the wall of the cylinder 23, or a small passage 27 may be formed through the piston, as shown in dotted lines.

The stem 25, which is secured to and moves with the triple-valve piston 8, passes through the valve 22 and is provided on its outer end with an exhaust-valve 28, which controls a passage 29, connecting the brake-cylinder passage 21 with the passage 30 leading to the atmosphere. A packing 31 on the piston 24 prevents leakage around the stem 25 when the piston 24 and the valve 22 are in the positions shown in the drawing.

A longitudinal passage 32 is formed in the interior of the stem 25 and transverse passages 33 and 34, which are formed through the stem, connect the ends of the passage 32 with the space surrounding the stem. The distance apart of the ports 33 and 34 is such that in making service applications of the brakes when the stem 25 slides through the valve 22, as the triple-valve piston 8 makes its full stroke and seats on the gasket 35, the port 33 will be moved to the left of the tubular projection 36 on the valve 22 and the port 34 will still be to the right of the valve 22, so that the ports 33 and 34 and the passage 32 will form a communication between the chamber 12 and the passages 20 and 21 leading to the brake-cylinder.

In making a service application of the brakes by means of a gradual reduction of train-pipe pressure the triple-valve piston 8 and the piston 24 are moved comparatively slowly to the left. The exhaust-valve 28 closes the port 29, the port 33 is moved to the left of the valve 22, and the piston 8 makes its full stroke to the left. The comparatively-slow movement of the piston 24 causes little or no reduction of pressure in the chamber or space 26, because the time in which the movement is effected is sufficient to permit the necessary flow of fluid around or through the piston 24 to prevent any considerable reduction of pressure in the space 26, and the valve 22 will not be unseated.

When the piston 8 bears on the gasket 35 and the valve 22 is on its seat, the piston 24 will be entirely removed from the cylinder 23 and the chamber 12 will be in communication with the brake-cylinder through the port 33, passage 32, port 34, and passages 20 and 21, and the brake-cylinder will be charged with fluid under pressure from the auxiliary reservoir.

In making an emergency application of the brakes the piston 8 and the piston 24 are moved suddenly to the left to the limit of their stroke, and the movement of the piston 24 in the cylinder 23 is so rapid that the fluid on the left of the piston 24 does not have time to flow through the small equalizing-passage, which is formed through or around the piston 24 before the piston has been moved in the cylinder 23 far enough to cause a great expansion of the fluid in the chamber 26, and such a reduction of pressure therein that the atmospheric pressure acting on the other side of the valve 22 will unseat the valve 22.

The unseating of the valve 22 puts the chamber 12 in communication with the brake-cylinder through the large passages 20 and 21 and causes a sudden and great reduction of pressure in the chamber 12, the capacity of the passage 13, through which the chamber 12 communicates with the auxiliary reservoir, being too small to prevent such reduction.

The sudden and great reduction of pressure in the chamber 12, caused by the opening of the valve 22, permits the train-pipe pressure to unseat the check or non-return valve 17, and fluid under pressure flows from the train-pipe through the passages 16 and 37 and through the chamber 12 and passages 20 and 21 to the brake-cylinder until the pressure in the brake-cylinder has nearly equalized with the pressure in the train-pipe, when the check-valve 17 will close and fluid from the auxiliary reservoir will flow through the passage 13, chamber 12, and passages 20 and 21 until the auxiliary reservoir and brake-cylinder pressures have equalized.

I claim as my invention and desire to secure by Letters Patent—

1. In an automatic fluid pressure brake system, the combination, with a release valve controlling the local release of fluid from the train pipe, of a chamber formed on or secured to the valve, and a piston fitting in the chamber which is held in its normal position by fluid under pressure and which is adapted, when moved rapidly, to effect a sufficient reduction of pressure in the chamber to cause the opening of the valve, substantially as set forth.

2. In an automatic fluid pressure brake system, the combination, in a triple valve device, of a release valve controlling the release of fluid from the train pipe, and a supplemental piston operative by the triple valve piston and fitting in a chamber formed on or connected to the release valve and adapted, when moved rapidly, to effect opening movement of the release valve by creating a reduction of pressure in the chamber, substantially as set forth.

3. In an automatic fluid pressure brake system, the combination, in a triple valve device, of a valve chamber having connections to the train pipe, to the auxiliary reservoir, and to the brake cylinder, a valve controlling a passage from the valve chamber to the brake cylinder, and a supplemental piston connected to the triple valve piston and fitting in a cylinder on one side of the valve and adapted, when moved rapidly, to effect opening movement of the valve by creating a reduction of pressure on one side of the valve, substantially as set forth.

4. In an automatic fluid pressure brake system, the combination, in a triple valve device, of a triple valve piston, a valve controlling the local exhaust of fluid from the train pipe, a supplemental piston connected to and operative by the triple valve piston and fitting in a chamber formed on the back of the valve, and means whereby when the supplemental piston is moved slowly an admission of fluid into the chamber is permitted to prevent movement of the valve and when the supplemental piston is moved rapidly a reduction of pressure is effected in the chamber sufficient to cause opening movement of the valve, substantially as set forth.

In testimony whereof I have hereunto set my hand.

ROBERT A. PARKE.

Witnesses:
GUSTAVO A. SACCHE,
WARREN L. MURRAY.